_United States Patent_ [19]

Pohl

[11] 4,215,554

[45] Aug. 5, 1980

[54] FROST CONTROL SYSTEM

[75] Inventor: Walter J. Pohl, Louisville, Ky.

[73] Assignee: General Electric Company, Louisville, Ky.

[21] Appl. No.: 910,816

[22] Filed: May 30, 1978

[51] Int. Cl.³ .................. F25D 21/06; F25B 41/00
[52] U.S. Cl. ...................................... 62/156; 62/209
[58] Field of Search .................. 62/151, 156, 209, 80

[56] References Cited

U.S. PATENT DOCUMENTS

| | | | |
|---|---|---|---|
| 2,988,896 | 6/1961 | Swart, Jr. | 62/156 |
| 2,988,897 | 6/1961 | McGrath | 62/156 |
| 3,280,579 | 10/1966 | Kayl | 62/156 |
| 3,466,888 | 9/1969 | Kyle | 62/156 |
| 3,553,975 | 1/1971 | Sakamoto | 62/156 |
| 3,578,754 | 5/1971 | Kusuda et al. | 62/156 |
| 3,633,374 | 2/1972 | Canter | 62/156 |
| 3,681,933 | 8/1972 | Check, Jr. | 62/156 |
| 3,950,962 | 4/1976 | Odashima | 62/156 |
| 4,109,639 | 8/1978 | Keegan | 126/422 |
| 4,129,993 | 12/1978 | Schotten | 62/156 |

_Primary Examiner_—William E. Wayner
_Assistant Examiner_—Harry Tanner
_Attorney, Agent, or Firm_—Frank P. Giacalone

[57] ABSTRACT

Frost control apparatus is disclosed for a temperature conditioning system such as a heat pump or the like, wherein a compressor circulates a volatile fluid through the closed system. Frost-buildup on the indoor and outdoor coils of the system is controlled by means of respective defrost cycles which occur in accordance with the conditions sensed by temperature sensing elements positioned at various points in the system. The defrost cycle for the indoor coil is maintained throughout a predetermined temperature range of ambient indoor air. The defrost cycle for the outdoor coil is initiated as a function of the differential between the temperature of the outdoor coil and that of ambient outdoor air and it varies in magnitude as a function of ambient outdoor air temperature. The termination of the outdoor coil defrost cycle is determined by a sensed temperature condition.

10 Claims, 3 Drawing Figures

FROST CONTROL SYSTEM

The present invention relates in general to new and improved frost control apparatus, in particular to frost control apparatus for use with heat pumps or similar closed temperature conditioning systems which bridge indoor and outdoor environments, wherein a compressor is used to circulate a volatile fluid through the system.

BACKGROUND OF THE INVENTION

It is well known that systems such as heat pumps or the like operate on a reverse cycle principle. In general, such a system includes indoor and outdoor heat exchange coils which are exposed to their respective ambient conditions. When the temperature of the indoor air is to be raised, the compressor pumps the volatile refrigerant fluid through the indoor coil and subsequently, by way of expansion means, through the outdoor coil of the system. The latter then acts as an evaporator by absorbing heat from the outdoor air. Simultaneously, the indoor coil acts as a condenser which gives off the heat previously absorbed from the outdoor air to the indoor environment.

Since the outdoor coil under these conditions operates at a temperature less than the ambient outdoor air, moisture carried by the latter condense on the outdoor coil and causes frost to be built up thereon. This layer of frost acts as an insulator between the outdoor air and the outdoor coil and so prevents effective heat transfer to the latter. Under these conditions, system efficiency is greatly reduced. Further, the frost on the coil may encase whatever sensing element is positioned thereon so as to produce a false reading of the condition which is intended to be sensed.

A similar action occurs with respect to the indoor coil when the latter is used as an evaporator in order to cool the temperature of the indoor air. Moisture carried by the indoor air is deposited on the indoor coil in the form of frost and reduces the efficiency of the system.

Workers in the air conditioning field are well aware of the problem of controlling the build-up of frost in temperature conditioning systems of this type and numerous schemes have been advanced to deal with it. It is recognized that the defrosting action itself may be carried out in a number of ways, e.g. by reversing the operation of the system, by terminating the system operation, by blowing heated air across the frost-carrying coil, etc., or by a combination of some or all these methods. The difficulty arises primarily in automatically choosing the points at which the defrosting action is to be initiated and terminated respectively, so as to maintain system operation at maximum efficiency. The problem is compounded by the fact that these operating points change with changing ambient conditions. Thus, while at low ambient outdoor temperatures it takes longer to accumulate a given thickness of frost than at higher temperatures, the defrosting action will also take longer than when a higher outdoor temperature prevails. Thus, the points at which the defrosting action of the outdoor coil are initiated and terminated respectively, must vary as a function of the outdoor air temperature in order for the system to operate at maximum efficiency.

Other ambient conditions will also affect the amount of frost which collects on the outdoor coil. For example, the humidity of the ambient air will determine in some measure the rate of frost build-up. Further, precipitation such as snow or freezing rain will affect the amount of frost deposited on the outdoor coil.

An effective frost control system must be capable of taking into account all of these ambient outdoor conditions in order to keep the outdoor coil frost-free and so as to operate the temperature conditioning system at high efficiency.

The deposit of frost on the indoor coil is affected only by some of the factors discussed above. These are primarily the temperature of the ambient indoor air and its humidity. An effective frost control system must also be capable of dealing with the latter conditions in order to provide efficient operation throughout.

A further requirement of an effective frost control system is reliability of operation under different and adverse conditions. Since the system is ordinarily serviced only at infrequent intervals, it must be capable of maintaining efficient operation for long time intervals without human intervention. Such a requirement dictates a reduction of the number of parts ordinarily found in prior art frost control apparatus which are subject to breakdown or to malfunction, as well as the ability to stand up under varying, adverse operating conditions.

Finally, the cost contribution of the frost control apparatus to the overall cost of the temperature conditioning system of which it is a part must be considered. This includes the initial cost, as well as the cost contribution to the maintenance of the overall system. The latter may be considerable if the frost control apparatus is complex and subject to break-down.

Earlier attemps at solving the problems associated with effective frost control have not been successful in all the areas discussed above. Much of the proposed equipment, particularly that which employs relatively complex mechanical apparatus to achieve frost control, is expensive to build, difficult to maintain and it is prone to break down or malfunction if left unattended for extended periods of time. Moreover, such equipment is difficult to adjust accurately for optimum operation and to maintain in adjustment during operation. As a consequence, optimum operating efficiency is rarely, if ever, achieved with such equipment, while the associated costs are often high. Still other prior art frost control equipment operates strictly on the basis of temperature check points. The operation of this type of equipment is frequently inaccurate and erratic since it fails to take into account the varying relationships of the relevant operating factors as the ambient conditions change.

OBJECTS OF THE INVENTION

Accordingly, it is a primary object of the present invention to provide frost control apparatus which is not subject to the foregoing disadvantages.

It is another object of the present invention to provide frost control apparatus which maintains maximum operating efficiency by automatically adjusting to varying ambient conditions.

It is a further object of the present invention to provide frost control apparatus which is simple and economical in construction and which is readily implemented and maintained.

These and other objects of the present invention together with the features and advantages thereof will become apparent from the following detailed specification when read in conjunction with the accompanying drawings.

DESCRIPTION OF THE INVENTION

Figure 1:
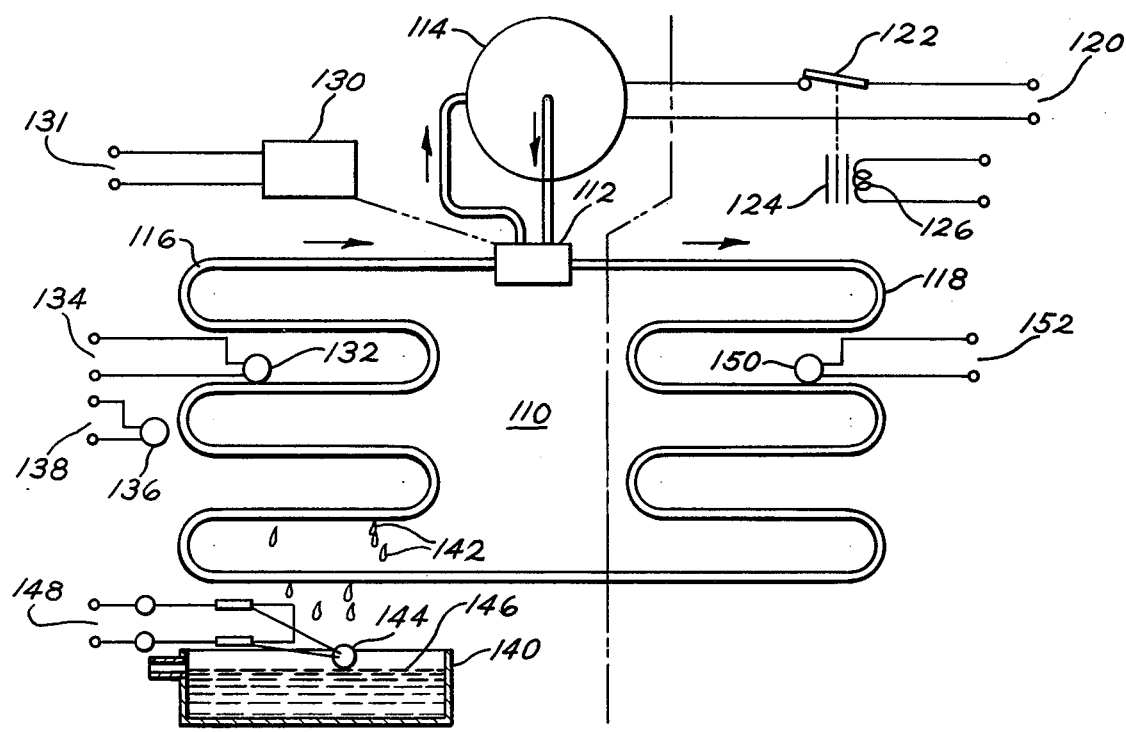
FIG. 1 illustrates a temperature conditioning system of the type to which the present invention is applied.

With reference now to the drawings, FIG. 1 illustrates a temperature conditioning system 110 of the type in which the present invention may be used. A reversible cycle, closed system is shown, which bridges indoor and outdoor environments and wherein a compressor 114 pumps a volatile fluid, e.g. a refrigerant, through the system in a direction determined by the setting of a valve 112. System 110 includes an outdoor heat exchange coil 116 and an indoor heat exchange coil 118 positioned in their respective indoor and outdoor environments. In a practical embodiment of the invention, the outdoor coil may be positioned entirely outdoors. Alternatively, it may be positioned in the wall which separates the indoor and outdoor environments, but protruding to the outdoors and exposed to ambient outdoor air. In FIG. 1, compressor 114 and 112 have been arbitrarily placed in the outdoor environment, although it will be understood that the position of these components may likewise be varied.

Compressor 114 is energized by an AC line voltage applied to terminals 120. A switch 122, in series with the AC line, is coupled to a solenoid relay 124. The latter is adapted to be actuated by a solenoid coil 126 in accordance with the signal applied to the coil terminals. A control unit 130 is coupled to valve 112 and is adapted to set the latter to a desired position in accordance with the direction in which the refrigerant fluid is to be pumped in system 110. Control unit 130 is energized from a pair of terminals 131 in accordance with an externally derived signal which determines whether the indoor coil will act as a cooling device or as a heat source for the indoor environment.

A temperature sensing element 132, which may comprise a thermistor device having a negative temperature coefficient of resistivity in a preferred embodiment of the invention, is positioned proximate outdoor coil 116. Element 132 is preferably placed in direct contact with the bare coil or, if prevented from doing so by the fins surrounding the coil, it may be positioned between the coil fins, spaced no more than ¼" from the coil itself. A pair of terminals 134 is associated with element 132 for connecting the latter into an electronic circuit, as will be explained in greater detail hereinbelow.

A further sensing element 136 has characteristics substantially indentical to those of element 132 and is positioned in the vicinity of coil 116. Element 136 is exposed to the ambient outdoor air conditions prevailing near coil 116, but is spaced sufficiently far from it so as not to be affected by frost build-up thereon. In a preferred embodiment, the temperature characteristics of sensing element 136 are identical to those of element 132. A pair of terminals 138 is associated with sensing element 136 for connecting the latter into an electronic circuit.

A catch basin 140 is positioned below outdoor coil 116 so as to collect the droplets 142 of melt water from outdoor coil 116 when the latter is in its defrost cycle. When the outdoor coil is located in the wall separating the two environments, the catch basin is similarly embedded in the wall. A temperature sensing element 144 is positioned at the entrance to catch basin 140. In a preferred embodiment of the invention, the sensing element 144 comprises a thermistor which has a predetermined negative temperature coefficient of resistivity. A pair of terminals 148 permits sensing element 144 to be connected into an electronic circuit.

A sensing element 150 is preferably positioned in contact with indoor coil 118. If prevented from doing so by the surrounding fin structure, element 150 may be located between the fins, preferably no further than ¼" from coil 118. In a preferred embodiment of the invention, sensing element 150 comprises a thermistor having a predetermined negative temperature coefficient of resistivity. A pair of terminals 152 permits sensing element 150 to be connected into an electronic circuit.

Figure 2:
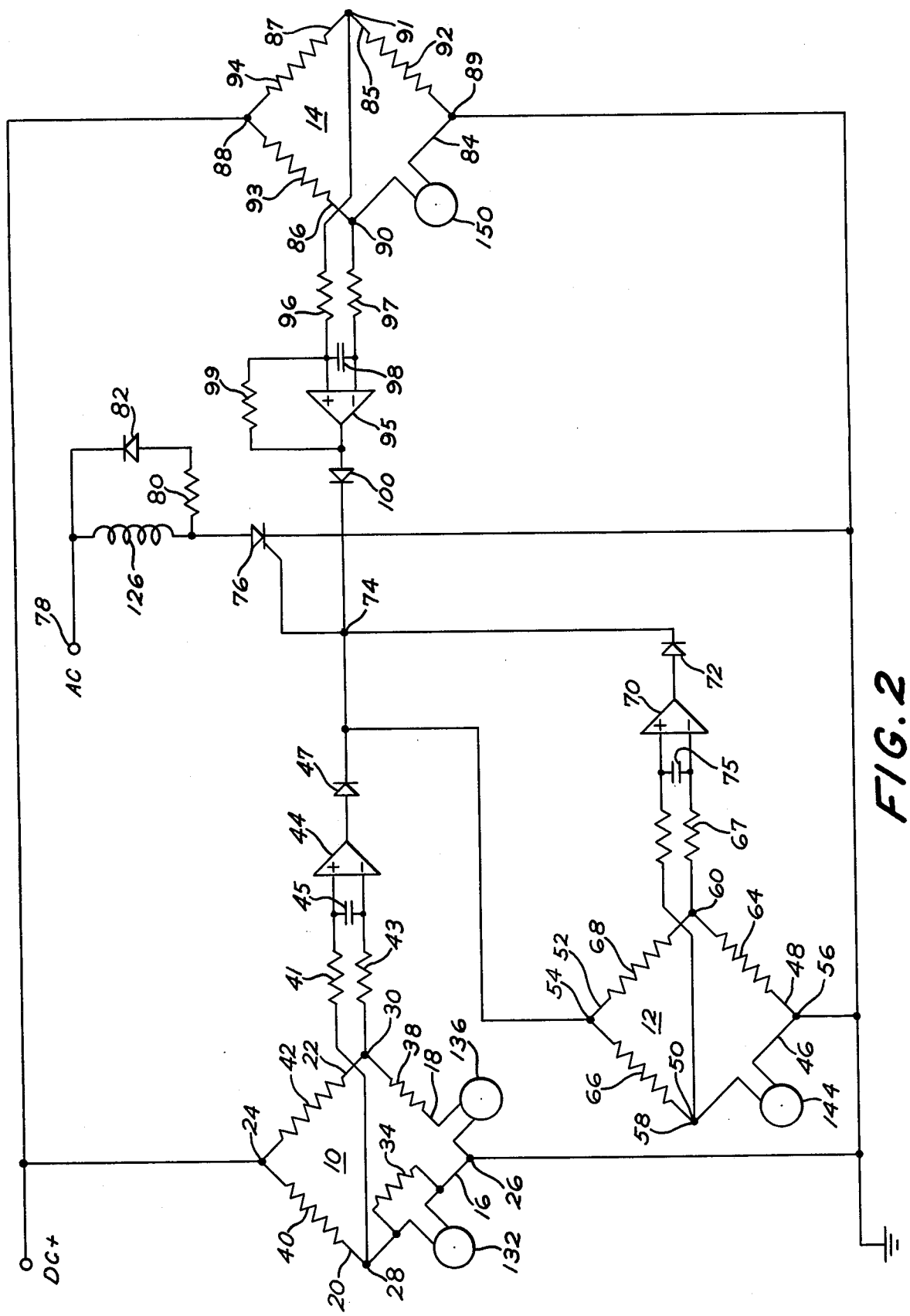
FIG. 2 illustrates a preferred embodiment of the present invention which is capable of controlling frost on both the indoor and outdoor heat exchange coils.

FIG. 2 illustrates frost control apparatus for use with a temperature conditioning system of the type shown in FIG. 1. The circuit shown consists of two portions applicable to outdoor and indoor coil frost control respectively. The first of these portions comprises a pair of differential voltage bridge circuits 10 and 12, while the indoor frost control section utilizes only a single differential voltage bridge circuit 14.

Bridge circuit 10 includes respective resistive circuit sections 16, 18, 20 and 22 which are connected by intermediately positioned nodes 24, 26, 28 and 30. A positive DC voltage, which need not be regulated, is applied across nodes 24 and 26. Node 26 is coupled to a reference point such as ground.

Circuit section 16 is connected between nodes 26 and 28 and comprises the aforesaid temperature sensing element 132 which has a resistor 34 connected in parallel therewith. As explained above, in a preferred embodiment of the invention sensing element 132 has a predetermined negative coefficient of resistivity, such that its resistance increases with a decrease in the temperature of the environment in which it is located. Circuit section 18 is connected between nodes 26 and 30 and includes the aforesaid temperature sensing element 136 which has characteristics substantially identical to those of element 132. Circuit section 18 further includes a resistance 38 which is connected in series with thermistor 136. Although a resistance of fixed value is shown, it will be understood that a selectively variable resistance may be employed to assist in adjusting bridge circuit 10. Circuit section 20 is connected between nodes 24 and 28 and includes a resistor 40 which has a substantially constant resistance value. Similarly, circuit section 22 is connected between nodes 24 and 30 and comprises a resistor 42 of substantially constant resistance value.

Nodes 28 and 30 are coupled to the input of a voltage comparator 44 by way of an RC filter. The latter comprises resistors 41 and 43 in series with respective comparator input terminals and a compacitor 45 connected across the latter terminals. Comparator 44 is adapted to provide a bi-level output signal. Comparator 44 may be of the type which is commercially available from National Semiconductor Company under the designation 3302 P and provides a change of voltage level from low to high voltage, e.g. from 0 V to 8 V, at its output. Output level switching occurs in response to a polarity reversal of the signal applied to the comparator input.

The output of comparator 44 is coupled to node 54 of differential bridge circuit 12 by way of a diode 47.

Bridge circuit 12 includes respective resistive circuit sections 46, 48, 50 and 52 which are connected by means of intermediate nodes 54, 56, 58 and 60. Node 56 is coupled to ground.

Circuit section 46 is connected between nodes 56 and 58 and includes the aforesaid sensing element 144, the characteristics of which were discussed above in connection with FIG. 1. Circuit section 48 is connected between nodes 56 and 54 and includes a resistor 64, which is selected so as to balance the resistance of sensing element 144 at the temperature at which switching is desired. Circuit section 50 is connected between nodes 54 and 58 and includes a resistor 66 which has a substantially constant resistance value. Similarly, circuit section 52 is connected between nodes 54 and 60 and includes a resistor 68 of substantially constant resistance value.

Nodes 56 and 60 are coupled to the input of a second comparator 70 by way of an RC filter comprising resistors 65 and 67 connected in series with the comparator input terminals and a capacitor 75 connected across the latter terminals. This comparator is preferably of the type discussed above in conjunction with comparator 44 and may have substantially identical characteristics to the latter. The bi-level signals which appear at the outputs of comparators 70 and 44 are coupled to a common junction point 74 by way of diodes 72 and 47 respectively, as well as to node 54 of bridge circuit 12.

Junction point 74 and diodes 47 and 72 serve the function of a logical OR gate by combining the bi-level signals derived at the outputs of comparators 44 and 70. In addition to being coupled to bridge circuit 12, the output signal of the OR gate is applied to one terminal of a silicon controlled rectifier 76. SCR 76 is connected in series with relay coil 126 between an AC line terminal 78 and ground. A resistor 80 and a diode 82 form a series combination which is connected in parallel with the relay coil. In lieu of SCR 76, a transistor or a sensitive triac may be used.

As previously explained, sensing element 132 is positioned proximate coil 116, i.e. either in direct contact therewith or positioned sufficiently close so that it will be encased if a layer of frost accumulates on the outdoor coil. In either case, it senses coil temperature. Sensing element 136 measures the ambient outdoor air in the vicinity of coil 116. Although the effective resistance of bridge circuit section 16 is substantially equal to that of circuit section 18 when bridge circuit 10 is balanced, the effective temperature coefficient of resistivity of the two circuit sections is not the same. This is due primarily to the presence of resistor 34, which is connected in parallel with sensing element 132. Thus, the effective resistance of circuit section 18 will decrease more rapidly for a sensed temperature change of a given magnitude, than will the effective resistance of circuit section 16 due to a sensed temperature change of the same magnitude. Further, the presence of resistor 38 in series with element 136 moves the characteristic operating curves of the two circuit sections apart. The function of this feature of the invention will become apparent from the discussion below.

As compared to the outdoor coil portion of the circuit described so far which relies on sensing elements 132, 136 and 144, the control of frost on indoor coil 118 depends on a single sensing element 150. As shown in FIG. 2, sensing element 150 forms part of differential bridge circuit 14. The latter comprises four resistive circuit sections 84, 85, 86 and 87 connected by intermediate nodes 88, 89, 90 and 91. Nodes 88 and 89 are connected between the DC line voltage and ground respectively. Circuit section 84, which is connected between nodes 89 and 90, includes the aforesaid sensing element 150. Circuit section 85, which is connected between nodes 89 and 91, includes a resistance 92. The latter is selected to balance the resistance of sensing element 150 at the temperature where switching is desired. Circuit sections 86 and 87 comprise resistors 93 and 94 respectively, having substantially constant resistance values which are equal to each other in a preferred embodiment of the invention.

The output of differential bridge circuit 14 is derived across nodes 90 and 91 and is applied to a voltage comparator 95 by way of an RC filter network. Comparator 95 may be substantially identical to units 44 and 70, i.e. a bi-level signal is obtained at the comparator output which changes signal levels upon a change of polarity at the comparator input. The RC filter network includes resistors 96 and 97, connected between respective inputs of comparator 95 and nodes 90 and 91 respectively, and a capacitor 90 connected across the comparator inputs. A feedback resistor 99 is connected between the output of comparator 95 and one of the comparator inputs. The comparator output is further coupled to junction point 74 by way of a diode 100.

In operation, the signal applied to terminals 131 of control unit 130 determines whether system 110 will operate in the heating or cooling mode by suitably setting valve 112. Let it be assumed that the heating mode is selected wherein heat is extracted from outdoor air by outdoor heat exchange coil 116, to be dissipated through the indoor heat exchange coil 118. In this mode of operation, outdoor coil 116 acts as an evaporator which absorbs heat from the outdoor air so as to bring the refrigerant fluid from its liquid to its gaseous state. Conversely, indoor coil 118 acts as a condensor which gives off heat to the ambient indoor air in the process of converting the gas to a liquid.

For the heating mode, valve 112 is set to cause the refrigerant fluid to circulate in the direction indicated by the arrows in FIG. 1. Initially bridge circuit 10 is unbalanced so that the potential of node 28 relative to node 30 is negative. As explained above, comparator 44 will switch to provide a high voltage level at its output if the applied input signal has the polarity shown in FIG. 2. Thus, for the unbalanced bridge condition the signal level at the comparator output remains at zero. The application of the zero signal level to bridge circuit 12 maintains the latter in a non-energized state. As a consequence comparator 70, which responds to the potential across nodes 58 and 60, also maintains its output at the zero signal level. Further, since the indoor defrost circuit portion is inactive when the system is operating in the heating mode, the output of comparator 95 is similarly zero.

Since all input signals of the OR gate are zero, junction point 74 is maintained at the zero voltage level and SCR 76 remains cut off. The AC voltage at terminal 78 therefore fails to energize relay coil 126 and hence relay 124 remains in its inactive state. In a preferred embodiment of the invention switch 122, which controls the application of power to compressor 114, is normally closed. Accordingly, while relay 124 is inactive, the application of power to the compressor is not interrupted.

As previously discussed, the ambient outdoor air gives up heat to coil 116 and in the process deposits moisture on the coil. This moisture turns into a layer of frost on the cold coil surface. In time, the frost insulates the coil, as well as sensing element 132 which is positioned on the coil, from the ambient air. Thus, the temperature to which element 132 is exposed will be increasingly that the frost layer rather than that of the coil itself, so as to produce a change in the resistance of this sensing element. On the other hand sensing element 136, which is positioned in the vicinity of coil 116 but out of contact with the latter, will continue to measure the temperature of the ambient air. As a consequence, the temperature differential between sensing elements 132 and 136 will increase progressively as the layer of frost builds up. This action will eventually balance bridge circuit 10 and subsequently unbalance it in the opposite direction, thus producing a change of polarity across nodes 28 and 30. When node 28 becomes positive with respect to node 30, comparator 44 responds by switching its bi-level output signal from zero to the high voltage level.

The new signal level, which is coupled to junction point 74 by way of diode 47, is effective to turn on SCR 76. As a consequence relay coil 126 is energized, relay 124 is activated and switch 122 opens to interrupt the application of power to the compressor from terminals 120. Thus, when the temperature differential between the ambient outdoor air and the outdoor coil 116 increases beyond a predetermined threshold, it indicates an excessive frost condition of the outdoor coil and the outdoor coil defrost cycle is initiated.

The bi-level comparator signal from unit 44 is further coupled to node 54 so as to energize bridge circuit 12. The parameters of this bridge circuit are chosen such that the bridge is normally unbalanced and node 58 is positive with respect to node 60. When bridge circuit 12 is energized under these conditions, comparator 70 responds by providing a high signal level at its output. The latter signal level is coupled to junction point 74 by way of diode 72, as well as being fed back to node 54 of bridge circuit 12.

As explained above, compressor 114 is shut down upon the initiation of the outdoor coil defrost cycle. The action of relay 124 may be further utilized to initiate positive defrosting, e.g. by heating or the like, if the system is so equipped. In either case, the temperature of the outdoor coil 116 rises, causing the frost deposited thereon to melt. In the absence of cooling by the refrigerant, the temperature of coil 116 approaches the ambient outdoor air temperature. The temperature sensed by element 132 thus approaches that sensed by element 136 so as to first balance the bridge and then return it to its previous unbalanced condition. Accordingly, the output signal level of comparator 44 switches back to zero.

The latter action does not, however, deenergize bridge circuit 12 due to the fact that the bi-level output signal of comparator 70 is fed back to node 54 of that bridge circuit. Thus, the positive potential across nodes 58 and 60 of bridge circuit 12 is maintained and the bi-level signal at the output of comparator 70 remains high. Due to the logical OR gate arrangement described above, the signal level at junction point 74 also remains high and hence SCR 76 continues to conduct. Relay coil 126 remains energized and relay 124 continues to hold switch 122 open to continue the defrost cycle.

As explained above, sensing element 144 is exposed to the droplets 142 of melt water which remains at approximately 32° F. until the defrosting action produces no further melting. At that point the ambient outdoor air, or such heat as is transferred through the wall which separates the outdoor and indoor environments, raises the temperature of the melt water and hence of sensor 144. At a predetermined temperature, e.g. at 36° F., the resistance of sensing element 144 changes sufficiently to cause bridge circuit 12 to become first balanced and subsequently unbalanced in the opposite direction. The bi-level signal at the output comparator 70 then switches to zero, thereby cutting off SCR 76 and deactivating relay 124 by deenergizing relay coil 126. This action terminates the defrost cycle by permitting switch 122 to revert to its normally closed position and to restore power to comparator 114.

In essence, therefore, in the present invention the buildup of frost on sensing element 132 causes bridge circuit 10 to become balanced. The resultant signal from comparator 44 initiates the defrost cycle and it further energizes bridge circuit 12. The latter action produces a signal at the output of comparator 70. This signal is fed back so as to maintain the energization of bridge 12 and continue the defrost cycle. The defrost cycle is terminated by the action of bridge circuit 12 only when all the frost has melted off outdoor coil 116.

It will be noted that bridge circuit 10 becomes active when the differential in the temperature sensed by elements 132 and 136 respectively, exceeds a predetermined threshold level. It is a feature of the present invention that this threshold level, which represents the difference between outdoor coil temperature and outdoor ambient air temperature, decreases with decreasing ambient outdoor air temperature. This action is brought about by the difference in the effective negative temperature coefficients of resistivity of circuit sections 16 and 18, as noted above and it effectively compensates for the fact that at lower outdoor ambient temperatures less heat is absorbed by the outdoor coil from the ambient outdoor air. Thus, in accordance with the present invention, maximum operating efficiency of the system is maintained by initiating the defrost cycle at a smaller differential temperature when the ambient outdoor air temperature is low, than is the case at higher outdoor air temperatures.

Figure 3:
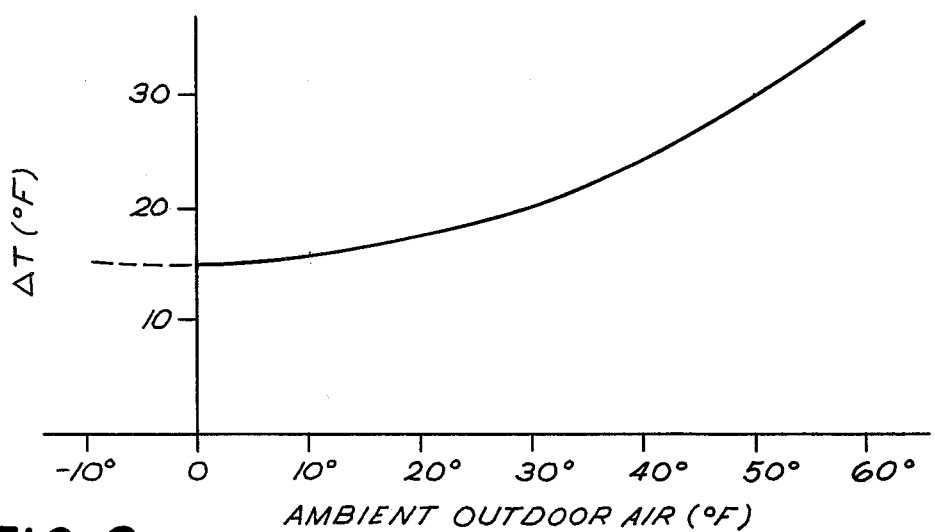
FIG. 3 illustrates in graph form the temperature relationships of the apparatus shown in FIGS. 2 and 3.

A typical relationship of these parameters for effective operation is shown in FIG. 3, wherein the threshold level, i.e. the differential ΔT between the temperatures sensed by elements 132 and 136 which prevails at the start of the defrost cycle, is plotted against outdoor ambient temperature. It will be noted that the threshold level decreases with declining ambient outdoor temperature. No frost build-up occurs beyond an ambient temperature of approximately +53° F.

If it is desired to operate the temperature conditioning system 110 in its cooling mode, a suitable signal is applied to terminals 131 which causes control unit 130 to switch valve 112 to its opposite setting. For the latter setting, the direction of fluid flow will be opposite to that shown in FIG. 1. In this case, indoor coil 118 acts as an evaporator and outdoor coil 116 becomes the condensing coil.

If the ambient indoor air contains moisture, frost may be caused to be deposited on coil 118. As explained above, temperature sensing element 150 is positioned proximate coil 118, preferably in contact with the coil. If prevented from contact with the coil by the surrounding fin structure, element 150 is positioned at a spacing sufficiently close so that frost build-up on the coil will also encase the element.

Bridge circuit 14, which is normally balanced, becomes unbalanced when frost on coil 118 encases element 150. The resultant positive potential between nodes 90 and 91 is applied to the input of comparator 95 and causes the latter to switch. The resultant high voltage level at the comparator output is applied to junction point 74 and thence to SCR 76 which becomes conductive. Relay coil 126 is thus energized and activates relay 124 so as to open switch 122. Accordingly, compressor 114 is shut down.

It will be noted that the output signal of comparator 95 is fed back to the comparator input by resistor 99. Resistors 99 and 90 form a voltage divider by means of which a portion of the voltage at the comparator output is fed back to the comparator input. The presence of the feedback resistor connection causes the comparator to be turned on, i.e. switched to provide a high voltage level at its output, when a first positive potential appears across nodes 90 and 91 representative of a predetermined indoor coil temperature. The comparator remains turned on even after the balance of bridge circuit 14 is restored. Thus, the defrosting action continues until a second predetermined potential appears across nodes 90 and 91, lower than the first potential. Power to compressor 114 is restored upon the occurrence of the latter potential, which is representative of an indoor coil temperature higher than the one at which the defrost cycle was initiated.

Thus, since the voltage across nodes 90 and 91 is a function of the temperature sensed by element 150, i.e. the temperature of the indoor coil, the circuit arrangement described maintains the indoor coil defrost cycle throughout a predetermined temperature range to assure complete defrosting. This range can be tailored to the precise requirements of the system by the choice of the values of resistors 92, 99 and 90. In a preferred embodiment of the invention, the start of the indoor coil defrost cycle is set to occur at a temperature of 32° F. and it terminates at a temperature of approximately 48° F., both sensed by element 150.

It will be clear from the foregoing discussion that the invention is not limited to the embodiment illustrated and discussed herein and that its structure as well as its operation may be modified without departing from the basic principles thereof. As stated, the defrost cycle, whether for the indoor or outdoor coil, may be implemented in ways other than shutting down the compressor. For example, the direction of fluid flow in the closed temperature conditioning system may be temporarily reversed. In this manner the frost-carrying evaporator coil temporarily becomes the condenser coil. Its temperature rises as a result of the reversed operation, and hence the defrosting action is speeded up. Similarly, special heaters may be employed, preferably in conjunction with fan motors, which direct heated air at the frost-laden coil when a defrost cycle is initiated.

As pointed out above, the circuit which combines the various signals that are coupled to junction point 74 effectively constitutes a logical OR gate. The presence of a high voltage level in any one of the signals which are being combined will provide an output signal to activate SCR 76. In this type of an arrangement switch 122 is normally closed, but is opened when one or more of the bi-level signals applied to junction point 74 are at a high voltage level. The present invention is not limited to such an arrangement. For example, an AND gate may be employed to turn off SCR 76 if the latter is normally conductive when the compressor is operating. In such an arrangement, switch 122 may be normally closed, to be opened only when relay coil 126 is deenergized in response to the absence of a high voltage level in one or more of the bi-level signals coupled to junction point 74.

While the sensing elements preferably comprise thermistors, the invention is not so limited and requires only the presence of sensing elements which vary in a predictable manner, increasing or decreasing in value with a change of temperature.

Although not specifically shown in FIG. 2, it will be understood that selectively variable resistors may be included in one or more circuit sections of each bridge circuit. The purpose of such resistors is to permit the respective bridge circuits to be manually balanced if such fine adjustment is desired.

The invention herein disclosed provides a frost control system whereby a defrost cycle is initiated and terminated independently of ambient conditions, such as ambient air temperature, wind gusts, etc. The invention is implemented in a manner that permits it to be incorporated at relatively low cost into a temperature conditioning system such as a heat pump or the like and where it requires only a minimum of maintenance.

Numerous modifications, variations and changes will now occur to those skilled in the art, all of which fall within the spirit and scope of the present invention. Accordingly, the invention is intended to be limited only by the scope of the appended claims.

What is claimed is:

1. Frost control apparatus for a temperature conditioning system which bridges indoor and outdoor environments and wherein a compressor is adapted to circulate a volatile fluid through the system, said system further including indoor and outdoor heat exchange coils exposed to respective ambient conditions and relay means adapted to control the circulation of said fluid; said apparatus comprising:

first circuit means including respective resistive circuit sections connected at intermediate nodes to form a differential bridge;

means for applying a line voltage across first and second ones of said nodes, said second node being coupled to a reference point;

first and second ones of said circuit sections each having one terminal thereof connected jointly to said second node and having opposite terminals connected to third and fourth nodes respectively;

said first and second circuit sections including first and second sensing elements respectively each having a predetermined temperature coefficient of resistivity, said first and second elements being positioned to sense the temperature of said outdoor coil and of ambient outdoor air respectively;

said first circuit section presenting an effective temperature coefficient of resistivity between said second and third nodes different from that presented by said second circuit section between said second and fourth nodes;

means coupled across said third and fourth nodes for providing a first bi-level signal, said last-recited means being responsive to a first predetermined potential across said nodes to provide a selected voltage level of said first signal, said selected signal level being representative of a temperature differential between said outdoor coil and said ambient outdoor air in excess of a predetermined threshold level, said predetermined threshold level varying with sensed ambient outdoor air temperature;

second circuit means coupled to said reference point;

means responsive to a second predetermined potential derived from said second circuit means for providing a second bi-level signal, a selected voltage level of said second signal being representative of a sensed temperature in excess of a predetermined limit;

means for logically combining said bi-level signals to provide a resultant output signal; and switching means responsive to said output signal for controlling the actuation of the relay means to initiate an output coil defrost cycle upon the occurrence of said selected first signal level and to terminate said cycle upon the occurrence of said selected second signal level.

2. Apparatus in accordance with claim 1 wherein said second circuit means includes a third temperature sensing element positioned to sense the temperature of melt water derived from the outdoor coil, said second predetermined potential derived from said second circuit means being representative of a temperature sensed by said third sensing element in excess of a predetermined limit.

3. Apparatus in accordance with claim 2 wherein:

said line voltage is a DC voltage adapted to be applied across said first and second nodes;

said means for providing said bi-level signals each comprises a comparator adapted to provide a change of voltage level at its output upon a polarity reversal at its input;

said means for combining said bi-level signals includes diode means coupled to the output of each of said comparators, said means for combining said bi-level signals being operative to function as a logical OR gate;

said second circuit means including respective resistive circuit sections connected at intermediate nodes to form a second differential bridge;

means for coupling said output signal to a first node of said second bridge;

first and second circuit sections of said second bridge each having one terminal thereof jointly connected to a second node and having opposite terminals connected to third and fourth nodes respectively of said second bridge, said last-recited second node being coupled to said reference point;

said last-recited first circuit section including said third sensing element; and said second predetermined potential being derived across said third and fourth nodes of said second bridge;

whereby said outdoor coil defrost cycle is terminated when the temperature of said melt water rises above said predetermined limit.

4. Apparatus in accordance with claim 3 and further including a catch basin positioned to collect said melt water, said third sensing element being positioned substantially in the path of said melt water entering said catch basin.

5. Apparatus in accordance with claim 3 wherein said first circuit section of said first bridge further includes resistance means connected in parallel with said first sensing element, said resistance means being selected to render the effective temperature coefficient of resistivity of said first circuit section less than that of second circuit section in said first-recited bridge;

whereby the temperature differential required to initiate said outdoor coil defrost cycle decreases with declining ambient outdoor air temperature.

6. Apparatus in accordance with claim 5 wherein said second circuit section of said first bridge further includes resistance means connected in series with said second sensing element, said last-recited resistance means being selected to increase said differential threshold level so as to enhance the accuracy of operation.

7. Apparatus in accordance with claim 6 wherein each of said sensing elements comprises a thermistor having a negative temperature coefficient of resistivity, said first and second sensing elements having substantially identical operating characteristics.

8. Apparatus in accordance with claim 7 wherein each of said bridges includes third and fourth circuit sections connected between said first node and said third and fourth nodes respectively of the corresponding bridge, each of said third and fourth circuit sections presenting a substantially constant resistance between its connected nodes.

9. Apparatus in accordance with claim 7 and further comprising a third differential bridge including respective resistive circuit sections connected at intermediate nodes;

means for applying said line voltage between first and second nodes of said third bridge, said last-recited second node being coupled to said reference point;

first and second circuit sections of said third bridge each having one terminal thereof jointly coupled to said second node and having opposite terminals coupled to third and fourth nodes respectively of said third bridge;

said last recited first circuit section including a fourth sensing element having a predetermined temperature coefficient of resistivity and being positioned to sense the temperature of said indoor coil;

a third comparator for providing a third bi-level signal at its output and adapted to change voltage levels upon a polarity reversal at the comparator input, said third comparator being adapted to provide a selected voltage level at its output in response to a third predetermined potential across said third and fourth nodes of said third bridge, said last-recited voltage level being representative of an indoor coil temperature in excess of a predetermined limit;

an RC network coupled between the input of said third comparator and said last-recited third and fourth nodes;

resistor feedback means coupled between the output and input of said third comparator and forming a voltage divider with the resistance of said RC network, said voltage divider being adapted to cause said third comparator to maintain its selected voltage level during a chosen range of potential across said last-recited third and fourth nodes; and means for coupling said third bi-level signal to said OR gate;

whereby said relay means is adapted to maintain an indoor coil defrost cycle throughout a selected range of indoor coil temperature corresponding to said range of third potential.

10. Apparatus in accordance with claim 9 wherein said fourth sensing element comprises thermistor means having a negative coefficient of resistivity; and wherein said third bridge circuit includes third and fourth circuit sections connected between said first node and said third and fourth nodes respectively of said third bridge, each of said second, third and fourth circuit sections of said third bridge representing a substantially constant resistance between its connected nodes.

* * * * *